Jan. 9, 1940. L. McCULLOCH 2,186,257
CRYSTALLINE BORIC OXIDE
Filed July 20, 1938
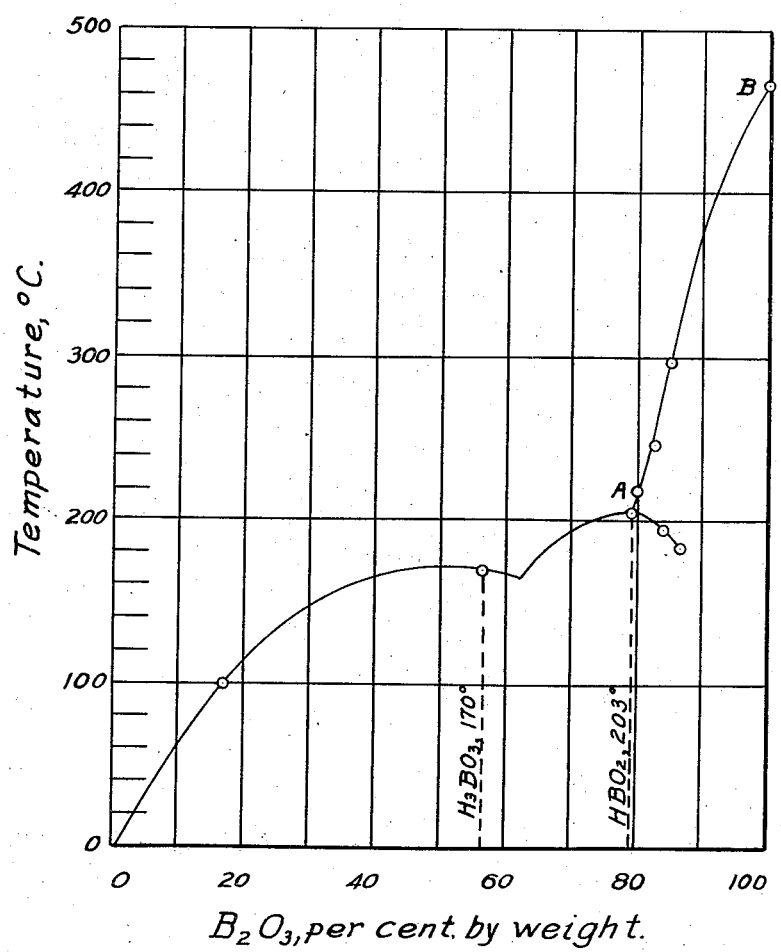
WITNESSES:
INVENTOR
Leon McCulloch.
BY
ATTORNEY Patented Jan. 9, 1940

2,186,257

UNITED STATES PATENT OFFICE 2,186,257

CRYSTALLINE BORIC OXIDE

Leon McCulloch, Pittsburgh, Pa., assignor to Westinghouse Electric & Manufacturing Company, East Pittsburgh, Pa., a corporation of Pennsylvania Application July 20, 1938, Serial No. 220,177

4 Claims. (Cl. 23—149)

This invention relates to crystalline boric oxide.

This application is a continuation-in-part of copending application, Serial No. 156,829, filed July 31, 1937, and directed to a Method of producing crystalline boric oxide now issued as Patent 2,137,058 and which is assigned to the same assignee as this invention.

An object of this invention is to provide as a new product, crystalline boric oxide.

Another object of this invention is to provide a crystalline boric oxide which has a high melting point and a high density.

Other objects of this invention will become apparent from the following description and the accompanying drawing, the single figure of which illustrates the solubility curve of the crystalline boric oxide of this invention.

In accordance with this invention, an anhydrous crystalline boric oxide is provided. The crystalline boric oxide is a new product having a high density of 2.42 and a high melting point of between about 460° and 470° C. Other characteristics of the crystalline boric oxide of this invention will be described more fully hereinafter.

In producing the crystalline boric oxide of this invention, boric acid may be employed. The boric acid employed may be of any of the types or technical grades having a moderate purity which can be purchased in the open market. These technical grades of the boric acid are to be preferred for the formation of the first seed crystals since it has been found through experiments that the growing of the crystals may be accomplished at a faster rate with the moderately pure boric acid than where chemically pure boric acid is employed.

In order to induce an initial crystallization, the crystals of which may be employed for the purpose of seeding other liquids, as described hereinafter, a quantity of the moderately pure boric acid may be placed in a suitable container, not shown, which is open to the atmosphere through a small vent and then subjected to a substantially constant temperature above the melting point of boric acid to fuse it until it becomes a viscous liquid. The heating of the boric acid in the container may be by any suitable means, although it is preferred that the heating be accomplished in an electric furnace provided with an automatic temperature control for controlling the heating temperature.

The heating may be continued until all of the excess steam escapes to the atmosphere and an examination of the viscous liquid reveals that the fused boric acid retains water in solution in an amount ranging from 8% to 14% by weight. It has been found necessary to have water in solution in the fused boric acid within the ranges given in order that crystallization of the liquid may be obtained. This is the percentage of water that remains in boric acid when fused at atmospheric pressure within the temperature range employed. If higher temperatures were employed, it would be necessary also to go to pressures higher than atmospheric pressure.

With the content of the water in solution ranging from 8% to 14% by weight and preferably from 10% to 12% by weight at atmospheric pressure, the viscous liquid may be further subjected to the substantially constant temperature. When subjected to the substantially constant temperature for a period of time of from 1 to 30 days, it has been found that minute crystalline bodies begin to develop and form about the walls of the container. An examination of the minute crystalline bodies developed in the viscous liquid reveals that they are of rounded or spheroidal shape of about .3 millimeter in diameter. Continued application of the substantially constant temperature to the viscous liquid causes the initial minute crystalline bodies to multiply with the liberation of water vapor until the whole of the liquid in the container becomes solidified. If the viscous liquid is examined when only 1% remains uncrystallized, it will be found that the 1% of the liquid still has a content of water in solution in the boric acid ranging from 8% to 14% by weight indicating that this content is necessary in order that the crystallization may be completed. As an example of the speed at which the viscous liquid crystallizes, a liter of the boric acid of moderate purity completely crystallized in a period of 7 days when heat treated as described hereinbefore whereas a liter of boric acid of chemical purity required twice as long a time.

In heating the viscous liquid to induce the initial crystallization and cause the liquid to completely crystallize, it is necessary that the temperature of the heating be below the temperature at which the crystals will dissolve and also to maintain the content of water in solution with the fused boric acid within the ranges given hereinbefore. A particularly effective heating range has been found to be between 220° C. and 250° C.

In order to produce the crystalline boric oxide in quantity, the crystals formed by the initial crystallization described hereinbefore may be employed as seeds for initiating the crystallization of other viscous liquids of fused boric acid. The initial crystals from the viscous liquid in the container before the liquid has been completely crystallized, or the solidified initial crystalline mass may be powdered and a portion thereof may be employed as seeds to induce crystallization of other viscous liquids of boric acid.

In producing the crystalline boric oxide in quantities, a quantity of boric acid may be fused in a similar manner to that described in producing the initial crystallization. After being fused under atmospheric pressure at a temperature above the melting point of boric acid and brought to a temperature of between 225° C. and 250° C., the seeds obtained from the initial crystallization may be introduced into the viscous liquid.

The crystalline boric oxide seeds added to the viscous liquid may be in any desired amount, although it is found that crystalline boric oxide seeds of the order of .1% to 1% by weight of the liquid to be crystallized are sufficient to cause a rapid crystallization of the viscous liquid. If a larger quantity of the initial crystals or seeds of boric oxide is added to the viscous liquid the crystallization action will be carried to completion in a shorter period of time.

An examination of the viscous liquid during the crystallization transformation reveals that at first a cloudiness is formed in the clear fused boric acid which increases with the escape of steam as bubbles therefrom, until the liquid becomes more and more pasty and finally solid. The crystals obtained are of microscopic size, the resulting crystalline mass being an anhydrous, white, opaque, non-glass like, stony solid and strong produce which is somewhat resilient under blows from a hammer. The crystalline structure of the new oxide can be definitely established by the sharp lines of its X-ray pattern.

Referring to the drawing, the solubility curve of the crystalline boric oxide of this invention is illustrated as added to the diagram of M. Von Stackelberg, F. Quatram and Jutta Dressel, Z. Elektrochem., 43, 14–28, (1937). In the graph, the ordinate is given as temperature in degrees C. and the abscissa as $B_2O_3$% by weight. The solubility curve A—B of the graph is based on the values as analyzed and given in the following table.

*Solubility of crystalline $B_2O_3$*

| Temp. | $B_2O_3$ in the liquid |
|---|---|
| °C. | Percent |
| 460–470 | 99.6 |
| 310–315 | 85.0 |
| 245–250 | 82.8 |
| 215–220 | 80.1 |

These solubilities may be easily determined by enclosing 25 g. of the crystalline oxide with small amounts of boric acid in sealed tubes of Pyrex glass and keeping them in electric ovens at the temperatures given until equilibrium of the liquid and the solid is obtained. A portion of the liquid may then be drained from the solid and solidified by rapidly cooling after which it may be analyzed by hydrating it under water to $H_3BO_3$, then drying the acid at 35° C. and weighing and calculating the $B_2O_3$ content by use of the factor 0.5631. This method of analyzing the crystalline oxide is quite accurate and is believed to be better than 99.6%.

The crystalline boric oxide of this invention is found to have a density of 2.42 as determined by weighing it in transformer oil after the removal of air in vacuum and to have a high melting point of between 460° C. and 470° C.

Since the crystalline boric oxide is free of water and, therefore, non-volatile, it is particularly useful in certain branches of industrial chemistry and in particular glass making. Other uses of the crystalline boric oxide of this invention are as reagents in analytical chemistry or as fluxes for use in welding as in metallurgy. The crystalline boric oxide of this invention may also be employed in the production of elemental boron and boron alloys by reduction with magnesium or other active metals. A further use of the crystalline boric oxide of this invention is as a desiccating agent, since it can take up about 77% of its weight of water in going back to boric acid.

Although the production of the new product, crystalline boric oxide, has been described with reference to a particular method for producing it, the new product of this invention is not to be limited thereto for it is conceivable that other methods may be developed for producing the crystalline boric oxide. This invention is, therefore, not to be limited except insofar as is necessitated by the prior art and the scope of the appended claims.

I claim as my invention:

1. As a new product, crystalline boric oxide having the formula $B_2O_3$ and a density of about 2.42.

2. As a new product, crystalline boric oxide having a melting point of between about 460° and 470° C. and a density of about 2.42.

3. As a new product, crystalline boric oxide, the crystalline boric oxide being substantially anhydrous, white and opaque and having a density of about 2.42.

4. As a new product, boric oxide in a crystalline form, the crystals being of microscopic size, the crystalline boric oxide having a melting point of between about 460° and 470° C., and being a substantially anhydrous, white and opaque mass having a density of about 2.42.

LEON McCULLOCH.